United States Patent Office 2,776,985
Patented Jan. 8, 1957

2,776,985

AROMATIC PHOSPHONIC ACID ESTERIFICATION CATALYSTS

Art C. McKinnis, Long Beach, Calif., assignor to Union Oil Company of California, Los Angeles, Calif., a corporation of California No Drawing. Application February 24, 1953,
Serial No. 338,605

9 Claims. (Cl. 260—475)

This invention relates to esterification procedures utilizing organic phosphonic acids as catalysts for promoting the reaction of alcohols with organic acids to form esters by dehydration. It is particularly concerned with high temperature esterifications wherein highly stable, non-volatile and non-oxidizing acid catalysts are greatly to be desired. The catalysts described herein are especially adapted for continuous or semi-continuous, high-temperature esterifications wherein alcohol and/or reactant acids are continuously or periodically added, and wherein water and/or product ester are continuously or periodically removed from the reaction zone. Under such esterification conditions, a definite problem has heretofore existed of keeping the catalyst, or its esters, in the reaction zone while withdrawing the other products.

It is accordingly an object of the invention to provide a new class of acidic esterification catalysts which are stable at high temperatures, e. g. 300° C. and over.

Another object is to provide such catalysts which are also non-oxidizing and otherwise non-destructive of the organic reactants.

Still another object is to provide active acidic esterification catalysts which are relatively non-volatile, and whose esters are also substantially non-volatile.

A more specific object is to provide efficient methods for esterifying high-melting, difficultly esterifiable acids such as the isomeric benzene and naphthalene dicarboxylic acids.

These and other objects are achieved by the methods more particularly described hereinafter.

The general reaction of an alcohol with a carboxylic acid in the presence of an acid catalyst to form esters is as follows:

(1) $n\text{ROH} + \text{R}_1(\text{COOH})_n \underset{}{\overset{\text{HX}}{\rightleftarrows}} \text{R}_1(\text{COOR})_n + n\text{H}_2\text{O}$ The instantaneous reaction velocity to the right is well known to depend primarily upon the relative concentration of reactants and products present at that moment, the ambient temperature, the strength of the catalyzing acid HX, and the solubility of the reactants in the reaction medium. Conditions which favor a rapid reaction rate to the right are: (1) high temperatures, (2) continuous removal of product ester and/or water, (3) complete solubility of the alcohol and reacting acid in the reaction medium, and (4) the use of an acid catalyst having a high dissociation constant, thereby giving a high $\text{H}^+$ concentration in the reaction mixture. The attaining of all these optimum conditions is generally restricted by conflicting reactions. For example, some acid catalysts such as sulfuric acid have more or less oxidizing tendencies which effectively limit the permissible reaction temperature. Also, even if a relatively non-oxidizing catalyst is employed, such as benzenesulfonic acid, the upper temperature limits may be restricted, among other reasons, because of thermal instability of the catalyst and/or volatility of the catalyst, or the esters thereof which are formed as follows:

(2) $\text{ROH} + \text{HX} \rightarrow \text{RX} + \text{H}_2\text{O}$

The RX esters formed as indicated ordinarily undergo metathesis with the reactant acid as follows:

(3) $n\text{RX} + \text{R}_1(\text{COOH})_n \rightarrow \text{R}_1(\text{COOR})_n + n\text{HX}$ thereby regenerating the catalyst acid. However, when the RX ester is volatile, and the product ester and/or water is being continuously removed from the reaction mixture, there will be a gradual depletion of catalyst acid due to volatilization of its ester. This tendency is especially pronounced at high temperatures, due partly to the fact that the velocity of reaction (2) with most mineral acids is more nearly equal to that of reaction (1) at high temperatures.

It has now been discovered that the aromatic phosphonic acids are in general highly active esterification catalysts, having high dissociation constants, and at the same time are very heat stable. They are in general stable at temperatures 50° to 100° C. higher than the decomposition temperature of corresponding organic sulfonic acids. They are also considerably more stable than the esters of phosphorous acid or phosphoric acid, which have been heretofore proposed as esterification catalysts. The organic phosphonic acids are characterized by a carbon-phosphorus bond, while the organic phosphites and phosphates contain only carbon-oxygen-phosphorus linkages.

Moreover, the aromatic phosphonic acids themselves, and their esters generally, boil at higher temperatures than the corresponding esters of phosphorous, phosphoric or sulfonic acids. Furthermore, the phosphonic acid esters are good solvents for many alcohols and acids, and since the phosphonic acids have very little oxidizing or dehydrating tendencies, it is possible to employ as large an excess thereof as may be desired, whereby the phosphonic esters formed during the reaction provide a highly advantageous solvent medium for the reaction.

The phosphonic acids employed herein may be designated by the following structural formula:

wherein R is an aromatic radical linked to the phosphorus atom by a non-carbonylic carbon atom. The carbon-phosphorus bond in the above compounds, as well as the P=O bond, are extremely heat-stable, and barring unstable structures within the R radical, the acids are generally stable at temperatures well over 300° C. R in the above formula may be for example any aryl, alkaryl, or aralkyl radical, which may or may not contain additional functional groups such as carboxyl —COOH, sulfonyl —SO$_3$H, phosphonyl —PO$_3$H$_2$, nitro —NO$_2$, hydroxyl —OH, chloro —Cl, bromo —Br, fluoro —F, carbonyl =C=O, oxy —O—, etc., with the single known exception that the linking carbon atom from R to the phosphorus atom should not be a carbonylic radical. Such compounds are for the most part unstable as free acids.

A particularly valuable group of phosphonic acids, from the standpoints of stability and non-volatility, consists of the relatively symmetrical aromatic acids which contain a second acid function. This preferred group of acids may be designated by the formula:

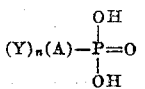

wherein A is an aromatic radical, and Y is an acid function such as carboxyl —COOH, sulfonyl —SO₃H, or phosphonyl —PO₃H₂, and $n$ is a small whole number from 1 to 4, preferably 1 or 2. Examples of such compounds include:

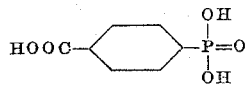

p-Carboxy phenyl phosphonic acid

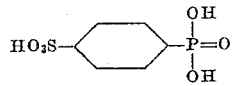

p-Sulfo phenyl phosphonic acid

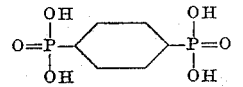

p-Phenylene diphosphonic acid

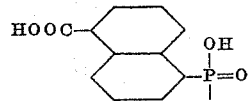

1,5-carboxy naphthyl phosphonic acid

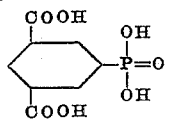

Sym. dicarboxy phenyl phosphonic acid

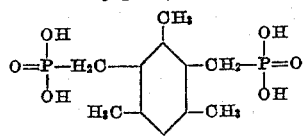

1,3-phosphonomethyl-2,4,6-trimethyl-benzene

The above acids, and others of similar generic structure, are high-melting solids which readily form mono-esters of the non-phosphono acid functions, and less readily with the phosphono acid functions. The esters are very high boiling compounds, usually liquids at room temperature, and in some instances are undistillable at atmospheric pressure. For example p-carboxy phenyl phosphonic acid and 1,3 phosphonomethyl-2,4,6-trimethyl-benzene both melt at over 300° C. and form undistillable ethyl esters. Such acids are eminently suitable for the purposes described herein.

Other phosphonic acids which may be utilized herein are described in Organophosphorus Compounds by Kosolapoff, John Wiley & Sons, N. Y., 1950, pp. 149–167. General methods of preparation are also described therein on pages 121–142. The phosphonic acids employed herein are for the most part known compounds, and they may be prepared by any of the methods previously described in the art. The compounds themselves and their preparation form no part of the present invention.

The phosphonic acid catalysts may be employed advantageously in any conventional esterification of an organic acid with an alcohol or phenol. If the alcohol and/or the reactant acid is a low boiling compound, the reaction temperature may be raised to 200° to 300° C. for example by operating under pressure. It is not essential however to employ high temperatures; the catalysts are substantially as effective at low temperatures as are the conventional catalysts such as sulfuric acid or benzene sulfonic acid. They may generally be employed in amounts ranging from about 1% to 20% by weight of the reactant acid employed, but other proportions may be employed if the conditions warrant.

As indicated above however the catalysts are particularly desirable for esterifying acids such as terephthalic acid, or isophthalic acid which are only slightly soluble in alcohols at low temperatures. In view of the insolubility of such acids in alcohols, and even in the reaction mixture which may contain substantial amounts of ester, their esterification rates are extremely slow at moderate temperatures, even though the reaction products are continuously removed from the mixture. For example U. S. Patent No. 2,578,312 discloses a process for esterifying phthalic acids with lower aliphatic alcohols by bubbling the alcohol vapor through a slurry of the dibasic acid in the dimethyl ester of the acids at about 150° C., while continuously removing the products formed. Sulfuric acid is employed as the catalyst, and a reaction time of about six hours is indicated. In that process, employing the catalysts described, it is found that if the temperature is raised appreciably above 150° C., the dehydrating and oxidizing action of the sulfuric acid begins to cause extensive charring. However, in accordance with the present invention, if the sulfuric acid is replaced with a suitable phosphonic acid, the reaction temperature may be raised to 225° to 275° C. without causing charring or other decomposition. It is also found that the reaction rate is increased so that esterification is essentially complete in about ⅓ the time indicated in the above patent. This procedure may be further exemplified by the following specific example, which is however illustrative only.

*Example I*

About 800 grams of pure terephthalic acid is placed in a four liter flask and 150 grams of solid p-carboxy phenyl phosphonic acid is added thereto. About 200 grams of dimethyl terephthalate is then added in order to provide a liquid slurry. The mixture is heated in an oil bath to about 240° C. and gaseous methanol is introduced into the bottom of the flask and allowed to bubble through the mixture. An overhead consisting of water, dimethyl terephthalate and methanol is continuously removed. As the reaction proceeds the mixture becomes a homogeneous solution, apparently due to the formation of the C-methyl ester of the phosphonic acid, which then acts as a solvent for the terephthalic acid. The reaction is essentially complete after about two hours, as indicated by the substantial absence of water in the overhead. The remaining dimethyl terephthalate is then distilled overhead, leaving almost pure methyl ester of p-carboxy phenyl phosphonic acid in the flask. About 1120 grams of water white dimethyl terephthalate is obtained, representing a yield of about 98.5% based on the original acid.

Other difficultly esterifiable acids may be esterified by procedures similar to the above. Prime examples of such acids include the higher fatty acids, e. g. stearic acid, oleic acid, palmitic acid, linoleic acid, lauric acid, etc. In most of the esterifications described herein the ester may be separated from the catalyst by distilling the ester overhead, though this may necessitate in some cases the use of sub-atmospheric pressures. In other cases, as for example when esterifying the higher fatty acids, it may be preferable to separate the catalyst from the product by other methods, e. g. solvent extraction. The phosphonic acids employed herein are at least fairly soluble in water, and they may hence be separated from the esters produced by washing with water. The following example illustrates a suitable batch-scale procedure for esterifying a higher fatty acid.

*Example II*

About 90 grams of stearic acid is admixed in a stainless steel pressure vessel with 110 grams of isobutanol and 5 grams of p-carboxy phenyl phosphonic acid. The reaction mixture is heated to approximately 260° C. for 1.5 hours under autogenous pressure. The vessel is then cooled to room temperature and the reaction products removed. The product is extracted with water to remove the catalyst and unreacted isobutanol. Upon washing and distillation under reduced pressure 79.5 grams of isobutyl stearate is obtained, representing a yield of 74% of theoretical, based on the stearic acid.

By substituting any of the other phosphonic acids described above for the p-carboxy phenyl phosphonic acid employed in the above examples substantially similar results are obtained. Similarly, other carboxylic acids and alcohols may be employed.

Another particularly advantageous utilization of the phosphonic acids lies in the esterification of secondary and tertiary alcohols, and phenols. It is well known that tertiary alcohols are particularly susceptible to dehydration during esterification processes which utilize sulfuric acid catalysts and/or high temperatures. The phosphonic acids described herein are substantially non-dehydrating and may therefore be employed advantageously for esterifying such difficultly esterifiable alcohols as isobutyl, tertiary butyl, and tertiary amyl alcohols.

Phenols are also a difficultly esterifiable class of alcohols, generally requiring the use of an acyl halide, or if a free carboxylic acid is employed, extended reaction periods are required. With the present catalysts the temperature may be safely raised to above about 225° C., thereby greatly accelerating the reaction. Those skilled in the art will readily appreciate that many other specific instances will exist where the present catalysts will prove advantageous.

While in the above description the free phosphonic acids are indicated as the active catalyst, and are initially present in the reaction mixture, it is also feasible to start with mono- or polyesters of the phosphonic acids. In such cases the esters undergo partial metathesis with the reactant acid, as indicated by Equation 3 above, to form free phosphonic acid. If the esters are employed, it is preferable to use esters of the same alcohol with which the reactant acid is to be esterified, thereby avoiding unnecessary contamination.

The foregoing disclosure of this invention is therefore not to be considered as limiting, since many variations may be made by those skilled in the art without departing from the scope or spirit of the following claims.

I claim:

1. A method for esterifying an organic carboxylic acid with an alcohol which comprises heating said carboxylic acid and said alcohol at a temperature above about 200° C. in the presence of catalytic proportions of an aromatic phosphonic acid having at least one additional acid function selected from the class consisting of carboxylic, sulfonic, and phosphonic acid groups.

2. A method as defined in claim 1, wherein the water of esterification is continuously distilled from the mixture.

3. A method as defined in claim 1 wherein said phosphonic acid is a benzene phosphonic acid, and wherein said additional acid function is in the para position.

4. A method for esterifying an aromatic polycarboxylic acid which comprises heating said acid with an alcohol at temperatures above about 200° C. in the presence of catalytic proportions of an aromatic phosphonic acid having at least one additional acid function selected from the class consisting of carboxylic, sulfonic, and phosphonic acid groups.

5. A process for preparing dimethyl terephthalate which comprises heating a slurry of terephthalic acid in a liquid reaction medium at a temperature above about 200° C. in the presence of catalytic proportions of an aromatic phosphonic acid containing at least one additional acid function selected from the class consisting of carboxylic, sulfonic, and phosphonic acid groups, continuously passing vaporized methanol through said slurry, and removing overhead a mixture of water, methanol and dimethyl terephthalate.

6. A process as defined in claim 5 wherein said phosphonic acid is p-carboxy phenyl phosphonic acid.

7. A method for esterifying a benzene dicarboxylic acid which comprises heating a slurry of said acid in a liquid reaction medium at a temperature above about 200° C. in the presence of catalytic proportions of an aromatic phosphonic acid containing at least one additional acid function selected from the group consisting of carboxylic, sulfonic and phosphonic acid groups, and continuously passing a vaporized alcohol through said slurry and removing overhead a mixture of water, alcohol and dibasic acid ester.

8. A method as defined in claim 7 wherein sufficient of said phosphonic acid is employed to give a homogeneous solution of said dibasic acid in said reaction medium.

9. A method as defined in claim 7 wherein said alcohol is a lower aliphatic alcohol.

References Cited in the file of this patent

UNITED STATES PATENTS

| | | |
|---|---|---|
| 2,275,494 | Bennett | Mar. 10, 1942 |
| 2,578,312 | Miller et al. | Dec. 11, 1951 |

OTHER REFERENCES

Richter: Textbook of Organic Chemistry (1938 Edition) pages 187-188.